United States Patent [19]

Tanaka et al.

[11] Patent Number: 4,508,425
[45] Date of Patent: Apr. 2, 1985

[54] MIRRORS AND METHOD OF MANUFACTURING THE SAME

[75] Inventors: Hiroshi Tanaka, Yokohama; Yoshitaka Iwata, Zama, both of Japan

[73] Assignee: Mitsubishi Keikinzoku Kogyo Kabushiki Kaisha, Tokyo, Japan

[21] Appl. No.: 442,717

[22] Filed: Nov. 18, 1982

Related U.S. Application Data

[63] Continuation of Ser. No. 201,627, Oct. 28, 1980, abandoned.

[30] Foreign Application Priority Data

Oct. 30, 1979 [JP] Japan ............................ 54-140238
Jan. 16, 1980 [JP] Japan .............................. 55-3411
Jan. 16, 1980 [JP] Japan .............................. 55-3410

[51] Int. Cl.³ ............................................ G02B 5/08
[52] U.S. Cl. ................................. 350/641; 350/320
[58] Field of Search ...................... 350/288, 307, 320

[56] References Cited

U.S. PATENT DOCUMENTS 4,139,269  2/1979  Backenköhler ................... 350/307

FOREIGN PATENT DOCUMENTS

| 60257 | 5/1976 | Japan . | |
|---|---|---|---|
| 154548 | 12/1976 | Japan . | |
| 135803 | 10/1980 | Japan | 350/320 |
| 404595 | 3/1932 | United Kingdom | 350/288 |
| 768637 | 2/1957 | United Kingdom | 350/288 |
| 1024347 | 3/1966 | United Kingdom | 350/288 |

OTHER PUBLICATIONS

*Plastics*, Sep. 1945, p. 48.
Piersol, Robert J., "Reflection Properties of Chromium", *I.E.S. Transactions*, vol. 20, 1925, pp. 1121–1125.

*Primary Examiner*—F. L. Evans
*Attorney, Agent, or Firm*—Oblon, Fisher, Spivak, McClelland & Maier

[57] ABSTRACT

A mirror is manufactured by plating chromium on one surface of a metal sheet bonded to a composite sheet made up of a synthetic resin sheet and the metal sheet to form a mirror surface. The mirror is worked to have a desired shape. In a modified embodiment, the mirror surface is formed with a decorative pattern.

10 Claims, 3 Drawing Figures

MIRRORS AND METHOD OF MANUFACTURING THE SAME

This is a continuation of application Ser. No. 201,627 filed Oct. 28, 1980, now abandoned.

BACKGROUND OF THE INVENTION

This invention relates to a mirror and more particularly a mirror having excellent nondestructiveness and workability, and a light weight, and a method of manufacturing such mirror at a low cost.

As is well known in the art mirrors are widely used as furnitures, vehicle mirrors, decorative articles or the like by utilizing their high reflectiveness.

Among known mirrors are included so-called glass mirrors, acryl mirrors and aluminum mirrors. A glass mirror is most common and comprises a glass sheet having a thickness of 5 to 10 mm and formed with a mirror surface by utilizing silver mirror reaction, while an acryl mirror comprises an acryl resin sheet with an aluminum layer vapor deposited on one surface thereof. An aluminum mirror comprises an aluminum sheet with one surface thereof plated with chromium.

These mirrors are not advantageous because they lack nondestructiveness, lightness, workability and low manufacturing cost. These defects will be described hereunder by taking a motor car mirror and a decorative mirror as examples.

Where a glass mirror or an acryl mirror is used for a motor car, in order to assure safeness against collision, the mirror is subjected to shatter preventing treatment including a number of process steps but in view of the characteristics of the blank it is difficult to completely prevent shattering. Moreover, the shatter preventing process steps are troublesome, thus increasing the manufacturing cost.

In the case of an aluminum mirror when the aluminum sheet is thin, not only the plating is difficult but also it is difficult to obtain a flat and smooth mirror surface. For this reason, the thickness of the aluminum sheet should be at least 2 to 3 mm which increases the cost.

Recent trend of decreasing fuel consumption of a motor car requires decrease in the weight of various parts of the car in the order of grams. Since a motor car is fabricated with numerous parts to meet this requirement it is necessary to decrease the weight of each part as far as possible, in the order of grams. However, there is a limit for the decrease of the weight of a glass mirror and an aluminum mirror, so that appearance of much lighter mirror has been strongly desired.

Various types of mirrors are used as indoor decorative articles. However, glass and acryl mirrors can not bend, thus manifesting poor workability. On the other hand, an aluminum mirror can bend to some extent but impossible to bend it sharply. In addition, the cutting workability of the aluminum mirror is poor. Thus, each type of mirror has a limit for workability so that it is not suitable as a decorative articles.

SUMMARY OF THE INVENTION

Accordingly, it is an object of this invention to provide a novel mirror having excellent nondestructiveness, light weight and workability and can be manufactured at a low manufacturing cost.

Another object of this invention is to provide a method of manufacturing a mirror having desirable characteristics just mentioned.

Still another object of this invention is to provide a mirror especially suitable for use on various types of vehicles.

A further object of this invention is to provide a novel mirror having an attractive pattern on the mirror surface.

According to one aspect of this invention there is provided a mirror of the type comprising a composite sheet including a synthetic resin sheet and a metal sheet bonded to at least one surface of the synthetic resin sheet, characterized by a mirror surface formed by plating chromium on a surface of the metal sheet.

According to another aspect of this invention there is provided a method of manufacturing a mirror of the type utilizing as a blank a composite sheet made up of a synthetic resin sheet and a metal sheet bonded to at least one surface of the composite sheet characterized in that chromium is plated on the surface of the metal sheet to form a mirror surface and that the resultant mirror is worked to have a predetermined shape.

According to a modified embodiment an ornamental pattern is formed on the mirror surface to render attractive the mirror.

DESCRIPTION OF THE PREFERRED EMBODIMENTS

Figure 1:
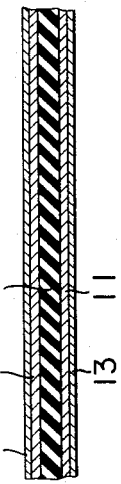
FIG. 1 is a sectional view of a mirror embodying the invention.

A mirror 10 of this invention utilizes as a blank a composite sheet in which metal sheets are bonded to one or both surfaces of a synthetic resin sheet 12.

The synthetic resin sheet 12 constituting the composite sheet is generally made of such polyolefin-resins as polyethylene, polypropylene and polybutene. The thickness of the synthetic resin sheet 12 is usually about 1–10 mm. As the metal sheet 11 may be used any metal sheet so long as it can be plated with chromium. Although aluminum, iron, copper, tin or nickel may be used, aluminum or iron is generally used. The thickness of the metal sheet may be sufficiently small, for example about 0.05–0.5 mm.

The synthetic resin sheet 12 and metal sheet or sheets 11 are bonded together to form the composite sheet according to a conventional method. For example, a lamination of the composite resin sheet with its surface melted and metal sheet or sheets is continuously passed between heating and pressing rolls to effect bonding.

Since a composite sheet comprising a polyethylene sheet and aluminum sheets bonded to the opposite surfaces thereof is available on the market, it is possible to use such composite sheet as the blank. A composite sheet with the surface of the metal sheet embossed to form a pattern can also be used.

According to this invention the surface of the metal sheet or sheets is plated with chromium layers as at 13 to form mirror surfaces.

Chromium plating may be made with a well known conventional method of manufacturing an aluminum mirror. For example, after polishing and degreasing the surfaces of the metal sheets and then removing impurities remaining on the surfaces, the polished surfaces are activated with a conventional method. Then, a plurality of prime coatings, not shown, are applied on the activated surfaces and then a plurality of nickel layers, not shown, are plated on the prime coatings. Finally, chromium layers 13 are electroplated on the nickel layers, thus obtaining a mirror. Where nickel sheets are used as the metal sheets 11 of the composite sheet it is not necessary to electroplate nickel.

Figure 2:
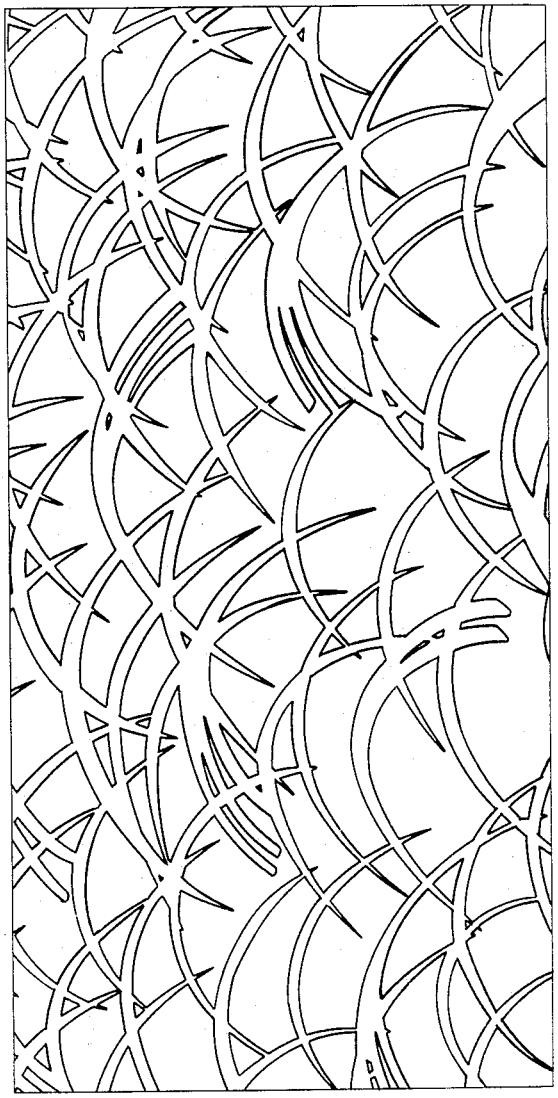
FIG. 2 is a plane view of a mirror of this invention showing one example of an ornamental pattern formed on the mirror surface.

To obtain a mirror having a decorative pattern as shown in FIG. 2 for example, on the mirror surface, a composite sheet including a metal sheet formed on its surface a desired pattern by etching is used and then the chromium layer 13 is plated on the surface of the metal plate. The pattern can readily be formed by mounting a mask formed with the pattern on the surface of the metal surface and then etching. For example, after applying and setting such masking material as epoxy resin or phthalic acid resin on the surface of the metal sheet, the masking material is partially removed to form the desired pattern. Then, the masked metal plate is subjected to a chemical etching or electrolytic etching by using hydrochloric acid, copper chloride, etc.

Figure 3:
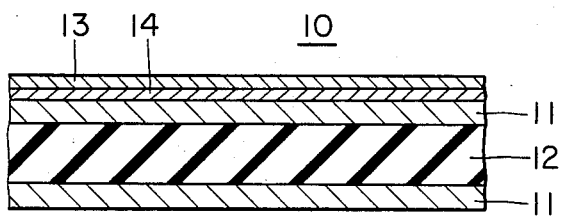
FIG. 3 is a sectional view of another mirror embodiment of the invention.

FIG. 3 shows a mirror embodiment of the present invention in which synthetic resin sheet 12 is sandwiched between aluminum sheets 11. The mirror structure is completed by plating a nickel layer 14 on one of the aluminum sheets and then plating a top chromium layer 13 on the nickel layer.

Mirrors of this invention for use on vehicles, a motor car for example, can be obtained by stamping a composite sheet formed with a mirror surface in a manner described above into a desired shape. The stamping can be accomplished by a conventional method utilizing a press including male and female dies.

The mirror of this invention has many advantages as shown in the following table over prior art mirror because it uses a composite sheet comprising a synthetic resin sheet and at least one metal sheet.

Distortion: measured according to a method prescribed in JIS D5705-1979.

Rupturing property: presence and absence of rupture were observed by applying impulsive force of 300 g×10 cm to a sample with an impulse punch having a diameter of 1.75 cm of a DuPont shock testing machine.

Dew forming property: The sample was held in a low temperature thermostatic bath at −22° C. for 10 minutes to form dew and then transferred into a constant humidity thermostatic bath maintained at a temperature of 28° C. and at a relative humidity of 62%, and the time during which the dew disappears was measured.

Cutting ability: Cutting was made with a Router machine at a speed of 180,00 r.p.m. and feed rate of 0.3 m/min. of the cutting tool to determine the cutting ability.

Punching force: Type TENSILON UTM-1, 5000 testing machine manufactured by Toyo Baldwin Co. was used. The sample was punched with a punch having a diameter of 50 mm and at a punching speed of 100 mm/min., and the maximum pressure was measured, the clearance between the punch and a metal die at the time of punching being 0.1 mm.

As can be noted from this table, when compared with conventional mirrors, all characteristics of the mirror of this invention are superior among which the not dewing property, lightness and workability are particularly to be noted.

In certain types of the mirror according to this invention, since attractive patterns are formed on the mirror surfaces, the mirrors have a high ornamental effect.

Moreover, since the mirror of this invention has excellent workability, various working can be made thereon with various wood working machines. This extends the field of use of the novel mirrors as decorative articles.

Further, the mirror of this invention has a weight of less than one half of that of conventional glass mirror or aluminum mirror so that it is suitable for use on various vehicles, an air plane or motor car, or railway car where decrease in the weight of parts is essential. The mirror of this invention manifests clear appearance free from scratch or irregularity.

|  |  | Mirror of this invention *total thickness 2 mm | Glass mirror 5 mm | Acryl mirror 2 mm | Aluminum mirror 2 mm |
| --- | --- | --- | --- | --- | --- |
| Property of mirror surface | reflectiveness (%) | 67 | 97 | 90 | 67 |
|  | distortion (%) | 0.5 | 0.1 | 3.0 | 0.5 |
| Rupturing property |  | not ruptured | ruptured | ruptured | not ruptured |
| Not dewing property (time of disappearance of dew, sec.) |  | 215 | 515 | 250 | 275 |
| Lightness (kg/m$^2$) |  | 2.8 | 12.6 | 2.5 | 5.6 |
| Workability | cutting ability with Router machine | good | — | good | not good |
|  | punching force (kg) | 610 | — | — | 2500 |
| Cost |  | O | O | X | X |

Remark:
*A composite sheet comprising a polyethylene sheet having a thickness of 1.5 mm and aluminum sheets, each 0.25 mm thick, bonded to the opposite surfaces of the polyethylene sheet was used as the blank.

Various values in the table were measured as follows.

Reflectivity: measured at an incident angle of 30° and a light receiving angle of 30° according to a method prescribed in JIS (Japanese Industrial Standard) D5705-1979.

To have better understanding of this invention, the following examples are given.

EXAMPLE 1

A mirror was prepared by using as a blank a composite sheet wherein aluminum sheets having a surface coarseness Rmax of 0.5μ and a thickness of 0.25 mm were bonded to the opposite surfaces of a polyethylene sheet having a thickness of 1.5 mm. The dimension of the composite sheet was 200 mm×200 mm. The composite sheet was suitably degreased, dipped in a 20% aqueous solution of nitric acid for about 30 seconds under normal temperature and then washed with water.

Then the resulting composite sheet was dipped in a commercially available zinc substitution liquid (Bondal Dip manufactured by W. Canning Limited, England) for one minute at normal temperature and then washed with water.

Immediately thereafter, the resulting composite sheet was dipped in a nickel plating bath having a pH of 4.6 and the following composition. While stirring with air the composite sheet was electroplated for 40 minutes at a current density of 3A/dm$^2$ and at a temperature of 60° C.

| | |
|---|---|
| nickel sulphate | 260 g/l |
| nickel chloride | 60 g/l |
| boric acid | 40 g/l |
| commercially available primary luster agent consisting essentially of saccarine (for example Nisol, 80 (I) manufactured by W. Canning Inc., England) | small amount |
| commercially available secondary luster agent consisting essentially of allyl compound (for example NISOL, 80 (M) manufactured by W. Canning Inc., England) | small amount |

Then, the resulting composite sheet was dipped in a plating bath consisting of 250 g/l of chromic acid anhydride and 1.6 g/l of sulphuric acid, then electroplated for 1.5 min. at a current density of 15 A/dm$^2$ and at a temperature of 40° C., washed with water and dried.

EXAMPLE 2

The mirror obtained in Example 1 was punched with 30 ton clamp press utilizing a metal die including a punch and a die to obtain a mirror for use on a motor car. The punch had a dimension of 153×81.5 mm, a radius of curvature of 20 mm at four corners, and a clearance between the punch and die of 0.05 mm. The resulting motor car mirror had a clear appearance free from any stripe and scratch.

EXAMPLE 3

A composite sheet similar to that of Example 1 used to form a mirror formed with a pattern on the mirror surface. After degreasing the composite sheet one of the aluminum surfaces was formed with a decorative pattern by screen printing technique utilizing a resist ink and dried for 30 minutes at 80° C. while rotating.

Thereafter, the resulting composite sheet was dipped in an etching solution having the following composition for 5 minutes and at 30° C.

| | |
|---|---|
| aqueous solution of ferrous chloride dissolved in the same amount of water | 100 g |
| concentrate hydrochloric acid solution | 50 g |
| Potassium chlorate | 10 g |

Then the resist ink was dissolved in a thinner to remove the resist ink film and the etched composite sheet was washed with water.

The step of nitric acid dipping and the following steps were executed like Example 1 to obtain a mirror with a pattern.

We claim:

1. A mirror, comprising:
   a sheet of synthetic resin, an aluminum sheet bonded to each surface of said synthetic resin sheet, and an electroplated nickel layer and an electroplated chromium layer which are sequentially formed on one of said aluminum sheets.

2. The mirror of claim 1, wherein said synthetic resin sheet has a thickness of 1-10 mm and each of said aluminum sheets has a thickness of 0.05-0.5 mm.

3. The mirror of claim 1, wherein said synthetic resin sheet is a polyolefin resin sheet.

4. The mirror of claim 1, wherein said mirror surface is formed with an ornamental pattern.

5. A method of manufacturing a mirror, comprising the steps of:
   preparing a composite sheet made up of a synthetic resin sheet and an aluminum sheet bonded to each surface of said synthetic resin sheet;
   sequentially electroplating on one of said aluminum sheets a nickel layer and then a chromium layer to form a reflective surface; and
   working the resulting mirror into a predetermined shape.

6. The method of claim 5, wherein said working is performed with a punching machine.

7. The method of claim 5, wherein said working is performed with a wood-working machine.

8. The method of claim 5, wherein said synthetic resin sheet has a thickness of about 1-10 mm and said aluminum sheets each have a thickness of about 0.05-0.5 mm.

9. The method of claim 5, which further comprises a step of forming an ornamental pattern on said mirror surface.

10. The method of claim 9, wherein said ornamental pattern is formed by applying a resist ink on said mirror surface with a screen printing technique, and then etching the mirror surface.

* * * * *